(12) United States Patent
Swaminathan

(10) Patent No.: US 9,836,317 B2
(45) Date of Patent: *Dec. 5, 2017

(54) CONTROLLING VIRTUALIZATION RESOURCE UTILIZATION BASED ON NETWORK STATE

(71) Applicant: Juniper Networks, Inc., Sunnyvale, CA (US)

(72) Inventor: Deepak Swaminathan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/929,887

(22) Filed: Nov. 2, 2015

(65) Prior Publication Data

US 2016/0070584 A1    Mar. 10, 2016

Related U.S. Application Data

(63) Continuation of application No. 14/620,482, filed on Feb. 12, 2015, now Pat. No. 9,176,758, which is a
(Continued)

(51) Int. Cl.
     *G06F 9/455*      (2006.01)
     *G06F 9/46*      (2006.01)
(Continued)

(52) U.S. Cl.
CPC .......... *G06F 9/45533* (2013.01); *G06F 9/455* (2013.01); *G06F 9/45558* (2013.01); *G06F 9/46* (2013.01); *G06F 9/48* (2013.01); *G06F 9/485* (2013.01); *G06F 9/4843* (2013.01); *G06F 9/4881* (2013.01); *G06F 9/4893* (2013.01); *G06F 9/50* (2013.01); *G06F 9/505* (2013.01); *G06F 9/5005* (2013.01); *G06F 9/5011* (2013.01); *G06F 9/5016* (2013.01); *G06F 9/5027* (2013.01); *G06F 9/5044* (2013.01); *G06F 9/5055* (2013.01); *G06F 9/5077* (2013.01); *G06F 9/5083* (2013.01); *G06F 9/5094* (2013.01); *G06F 15/173* (2013.01);
(Continued)

(58) Field of Classification Search
None
See application file for complete search history.

(56) References Cited

U.S. PATENT DOCUMENTS 7,577,722 B1    8/2009    Khandekar et al.
8,443,367 B1    5/2013    Taylor et al.
(Continued)

*Primary Examiner* — Charles Swift
(74) *Attorney, Agent, or Firm* — Harrity & Harrity, LLP

(57) ABSTRACT

A controller device is connected to a group of virtual machines and one or more network devices in a network. The controller device is configured to store policies relating to when to start up and when to shut down the virtual machines based on users logging into the network, users logging out of the network, users attempting to access the plurality of virtual machines, and/or particular types of traffic in the network; receive network activity data from a network device of the one or more network devices in the network; identify, based on the network activity data and the policies, a virtual machine, of the group of virtual machines, to start up or shut down; and cause the virtual machine to start up or shut down.

20 Claims, 12 Drawing Sheets

Related U.S. Application Data continuation of application No. 13/628,557, filed on Sep. 27, 2012, now Pat. No. 8,959,513.

(51) Int. Cl.
  *G06F 15/173* (2006.01)
  *G06F 9/48* (2006.01)
  *G06F 9/50* (2006.01)
  *H04L 12/26* (2006.01)

(52) U.S. Cl.
  CPC .... *H04L 43/04* (2013.01); *G06F 2009/45562* (2013.01); *G06F 2009/45575* (2013.01); *Y02B 60/144* (2013.01)

(56) References Cited

U.S. PATENT DOCUMENTS

| | | |
|---|---|---|
| 8,689,214 B2 | 4/2014 | Marshall et al. |
| 8,812,687 B2 | 8/2014 | Das et al. |
| 8,959,513 B1 | 2/2015 | Swaminathan |
| 9,176,758 B2 | 11/2015 | Swaminathan |
| 2007/0136814 A1 | 6/2007 | Lee et al. |
| 2007/0245348 A1* | 10/2007 | Araujo .................... G06F 21/53 718/1 |
| 2008/0235361 A1 | 9/2008 | Crosbie et al. |
| 2008/0301770 A1* | 12/2008 | Kinder ................ H04L 63/0823 726/2 |
| 2009/0288084 A1 | 11/2009 | Astete et al. |
| 2010/0107159 A1* | 4/2010 | Radhakrishnan ..... G06F 9/5055 718/1 |
| 2010/0217454 A1 | 8/2010 | Spiers et al. |
| 2010/0287548 A1 | 11/2010 | Zhou et al. |
| 2011/0023114 A1* | 1/2011 | Diab .................... G06F 9/4856 726/22 |
| 2011/0055372 A1* | 3/2011 | Elyashev ............... G06F 9/4418 709/224 |
| 2011/0185355 A1 | 7/2011 | Chawla et al. |
| 2013/0019015 A1 | 1/2013 | Devarakonda et al. |
| 2013/0074072 A1* | 3/2013 | Kennedy ............. G06F 9/44505 718/1 |
| 2013/0132948 A1 | 5/2013 | Hari et al. |
| 2014/0058871 A1 | 2/2014 | Marr et al. |

\* cited by examiner

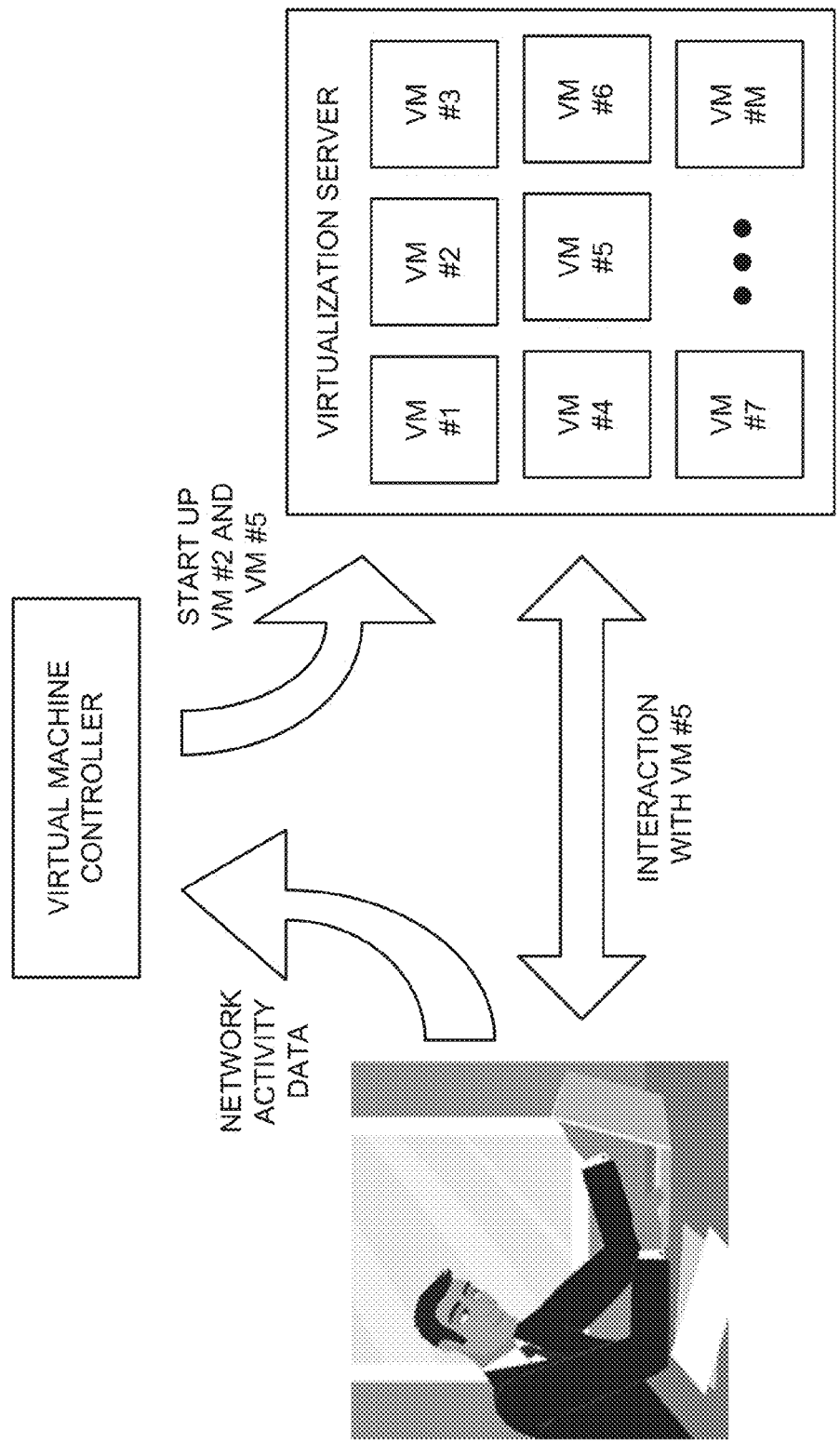

CONTROLLING VIRTUALIZATION RESOURCE UTILIZATION BASED ON NETWORK STATE

RELATED APPLICATIONS

This application is a continuation of U.S. patent application Ser. No. 14/620,482, filed Feb. 12, 2015 (now U.S. Pat. No. 9,176,758), which is a continuation of U.S. patent application Ser. No. 13/628,557, filed Sep. 27, 2012 (now U.S. Pat. No. 8,959,513), the entire contents of both applications are incorporated herein by reference

BACKGROUND

Enterprises have been turning to the use of virtual machines over physical machines as a cost-savings tool. A physical server may simultaneously run multiple virtual machines that may be used for various purposes. Enterprises typically have policies in place to determine when virtual machines should be running. These policies are static and based on time or load. A time-based policy may indicate the days and/or times that a particular virtual machine should be running. A load-based policy may indicate a load threshold that may be used to determine when to add another virtual machine.

SUMMARY

According to some example implementations, a system may include a controller device. The controller device may be connected to a group of virtual machines and one or more network devices in a network. The controller device may store policies relating to when to start up and when to shut down the virtual machines based on users logging into the network, users logging out of the network, users attempting to access the plurality of virtual machines, and/or particular types of traffic in the network; receive network activity data from a network device of the one or more network devices in the network; identify, based on the network activity data and the policies, a virtual machine, of the group of virtual machines, to start up or shut down; and cause the virtual machine to start up or shut down.

According to some example implementations, a method may be performed by a controller device connected to a group of virtual machines and one or more network devices in a network. The method may include storing, by the controller device, policies relating to when to start up and when to shut down the virtual machines based on at least two of: users logging into the network, users logging out of the network, users attempting to access the virtual machines, or particular types of traffic in the network; receiving, by the controller device, network activity data from a network device of the one or more network devices in the network; identifying, by the controller device and based on the network activity data and the policies, a virtual machine to start up or shut down; and causing, by the controller device, the virtual machine to start up or shut down.

According to some example implementations, a computer-readable medium may include instructions that, when executed by one or more processors, cause the one or more processors to store policies relating to when to start up and when to shut down a group of virtual machines based on at least three of: users logging into a network, users logging out of the network, users attempting to access the virtual machines, or particular types of traffic in the network; receive network activity data from a network device of a group of network devices in the network; identify, based on the network activity data and the policies, a virtual machine to start up or shut down; and cause the virtual machine to start up or shut down.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 1 is a diagram of an overview of an implementation described herein;

DETAILED DESCRIPTION

The following detailed description refers to the accompanying drawings. The same reference numbers in different drawings may identify the same or similar elements.

An implementation, described herein, may provide dynamic policies for determining when to start up a virtual machine and when to shut down a virtual machine. Rather than static policies based on time or load, these dynamic policies may be based on network activity data. As a result, virtual machines may be available when needed and shut down when not needed.

FIG. 1 is a diagram of an overview of an implementation described herein. Assume that a virtual machine controller stores dynamic policies relating to when to start up or shut down virtual machines operating on a virtualization server. The virtual machine controller may receive network activity data, such as which users or user groups are logged into the network, whether a particular user is requesting access to a particular virtual machine, and/or the types of traffic occurring in the network. Based on the network activity data and the dynamic policies, the virtual machine may determine whether to start up or shut down a particular virtual machine.

For the example of FIG. 1, assume that a particular user has been previously associated with three virtual machines (e.g., VM #2, VM #5, and VM #7). Assume further that the virtual machine controller stores policies that indicate that, when the particular user logs into the network, the virtual machine controller should start up virtual machines VM #2 and VM #5; that the virtual machine controller should start up VM #7 when the particular user requests to access VM #7; and that the virtual machine controller should shut down VM #2, VM #5, and VM #7 when the user logs out of the network.

As shown in FIG. 1, assume that the particular user logs into the network. The virtual machine controller receives network activity data, including information that the particular user has logged into the network. Based on this network activity data and the stored policies, the virtual machine controller starts up VM #2 and VM #5, but does not start up VM #7. Thus, when the particular user later attempts to access VM #5, VM #5 is already started up and running.

As a result, virtual machines may be available when needed and shut down when not needed. This saves power in the network, as the number of virtual machines that are running is directly proportional to the power that is being consumed.

Figure 2A:
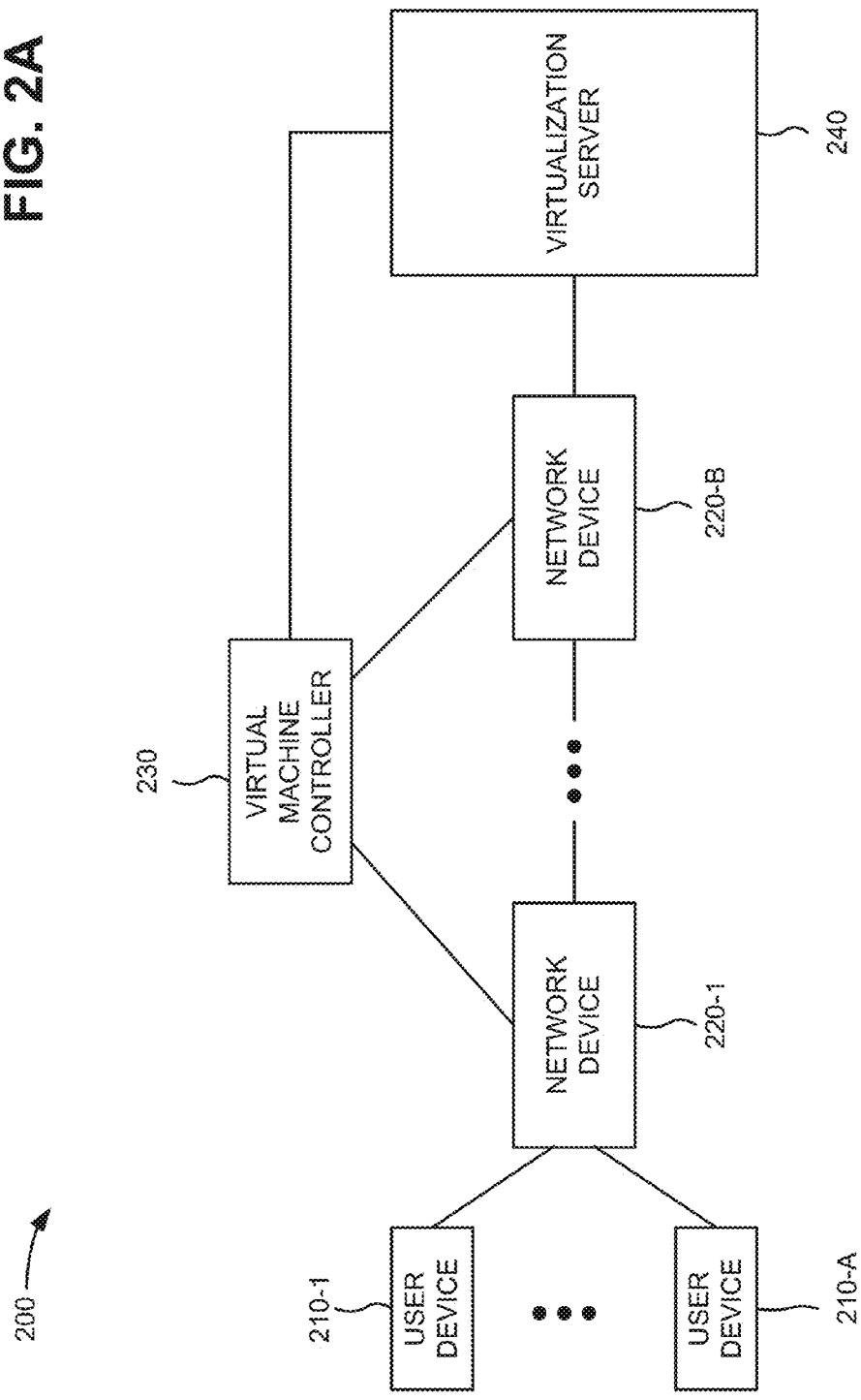
FIGS. 2A and 2B are diagrams of example environments in which systems and/or methods described herein may be implemented.
Figure 2B:
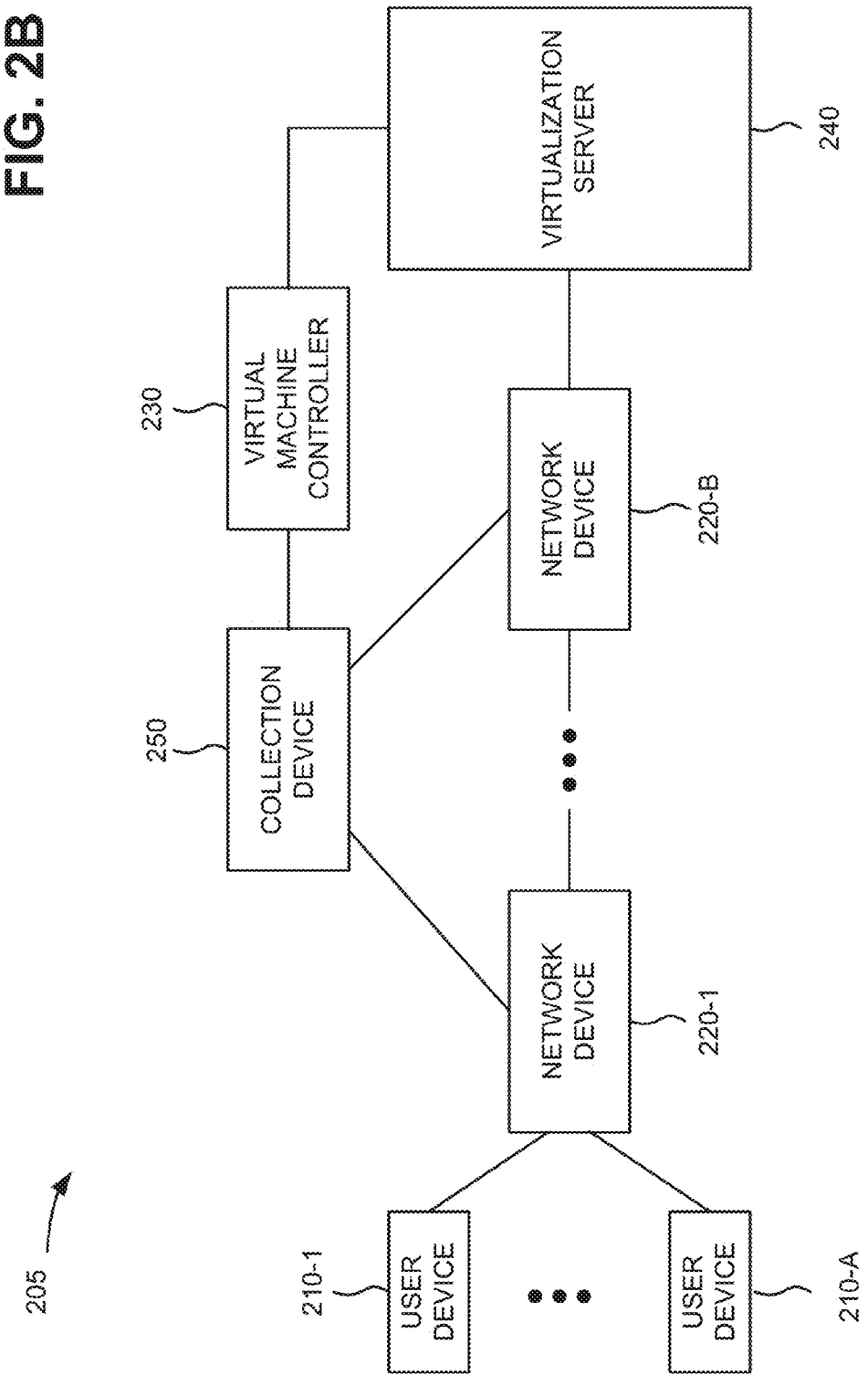

FIGS. 2A and 2B are diagrams of example environments 200 and 205, respectively, in which systems and/or methods described herein may be implemented. In some implementations, environments 200 and 205 may include a collection of devices associated with a private network, such as a corporate network, a residential network, a campus area network, or the like. In some implementations, the private network may correspond to a private cloud, a community cloud, an elastic cloud, or a hybrid cloud.

As shown in FIG. 2A, environment 200 may include user devices 210-1 through 210-A (A≥1) (referred to generally as "user devices 210" and individually as "user device 210"), network devices 220-1 through 220-B (B≥1) (referred to generally as "network devices 220" and individually as "network devices 220"), virtual machine controller 230, and virtualization server 240.

Each of user devices 210 may include a client device that is capable of communicating via a network, such as a private network. Examples of user device 210 may include a smart phone, a personal digital assistant, a laptop, a tablet computer, a personal computer, a gaming device, a desktop computer, or a combination of these and/or other types of communication devices. User devices 210 may store and execute applications that communicate with a network, such as the private network. Examples of these applications might include browser applications, gaming applications, communication applications, word processing applications, spreadsheet applications, or the like.

Each of network devices 220 may include a network device, such a wired or wireless access point, a router, a proxy server, a modem, a gateway, a bridge, a firewall, a combination of two or more of these network devices, or another type of network device. Network devices 220 may be associated with the private network and may process network traffic in the private network, such as by routing network traffic, filtering network traffic, regulating network traffic, terminating network traffic, or receiving network traffic, or the like. A network device 220 may communicate with a user device 210 and/or another network device 220 using a wireless interface and/or a wired interface.

Virtual machine controller 230 may include or be incorporated in a server device or a collection of server devices. In some implementations, virtual machine controller 230 may be a device separate from virtualization server 240. In some other implementations, virtual machine controller 230 may be incorporated in virtualization server 240. Generally, virtual machine controller 230 may store dynamic policies relating to when virtual machines should be started up and when virtual machines should be shut down. In some implementations, virtual machine controller 230 may directly control a virtual machine using, for example, an application programming interface (API). In some other implementations, virtual machine 230 may provide instructions to virtualization server 240, which may, in turn, carry out the instructions regarding a virtual machine.

Virtualization server 240 may include a server device or a collection of server devices. Virtualization server 240 may be responsible for implementing a group of virtual machines. Virtualization server 240 may be capable of concurrently running multiple virtual machines. Each virtual machine may be associated with a particular user device 210, a particular user of a user device 210, or a particular application capable of running on or communicating with a user device 210.

The example quantity and configuration of devices illustrated in FIG. 2A are provided for simplicity. In practice, environment 200 may include additional devices, fewer devices, different devices, or differently-arranged devices than illustrated in FIG. 2A. In addition, any single device, illustrated in FIG. 2A, may be implemented as multiple, possibly distributed, devices. Further, any two (or more) devices may be implemented as a single device. For example, virtual machine controller 230 and virtualization server 240 may be combined into a single device that performs the functions of both virtual machine controller 230 and virtualization server 240. Alternatively, virtual machine controller 230 and network device 220 may be combined into a single device that performs the functions of both virtual machine controller 230 and network device 220. Also, a function described as being performed by one of the devices may be performed by a different device or a combination of devices.

As shown in FIG. 2B, environment 205 may include user devices 210, network devices 220, virtual machine controller 230, virtualization controller 240, and collection device 250. In some implementations, user devices 210, network devices 220, virtual machine controller 230, virtualization controller 240, and collection device 250 may be associated with a private network.

User devices 210, network devices 220, virtual machine controller 230, and virtualization controller 240 may correspond to like devices described above with regard to FIG. 2A. Unlike environment 200 in FIG. 2A, environment 205 may include collection device 250.

Collection device 250 may include a server device or a collection of server devices. Collection device 250 may collect network activity data from network devices 220. In one example implementation, collection device 250 may correspond to an interface for metadata access point (IF-MAP) server. In another example implementation, collection device 250 may correspond to another type of device that collects network activity data. In some implementations, collection device 250 may provide a subscription service such that other devices can subscribe to receive certain kinds of network activity data. In these implementations, collection device 250 may receive network activity data from one or more of network devices 220 and provide the network activity data, subscribed to by virtual machine controller 230, to virtual machine controller 230.

The example quantity and configuration of devices illustrated in FIG. 2B are provided for simplicity. In practice, environment 205 may include additional devices, fewer devices, different devices, or differently-arranged devices than illustrated in FIG. 2B. In addition, any single device, illustrated in FIG. 2B, may be implemented as multiple, possibly distributed, devices. Further, any two (or more) devices may be implemented as a single device. Also, a function described as being performed by one of the devices may be performed by a different device or a combination of devices.

Figure 3:
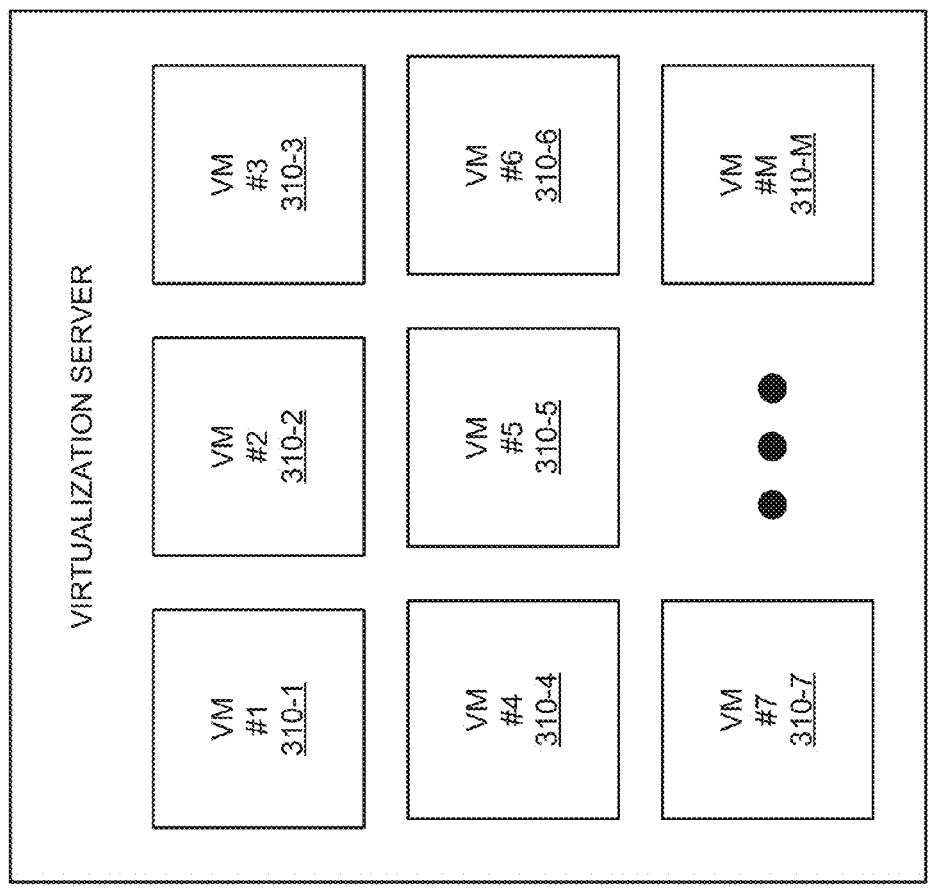
FIG. 3 is a diagram of example components of the virtualization server of FIGS. 2A and/or 2B.

FIG. 3 is a diagram of example components of virtualization server 240. As shown in FIG. 3, virtualization server 240 may include virtual machines 310-1 through 310-M (M≥1) (referred to generally as "virtual machines 310" and individually as "virtual machine 310").

Each virtual machine 310 may include a software implementation of a physical machine (e.g., a computer) that executes programs like a physical machine. In some implementations, as described above, a virtual machine 310 may be associated with a particular user device 210, a particular user of a user device 210, or a particular application capable of running on or communicating with a user device 210. In some implementations, some virtual machines 310 may execute the same operating system and/or set of applications. In some other implementations, some virtual machines 310 may execute different operating systems and/or sets of applications.

Each virtual machine 310 may be controlled via an API to, for example, start up or shut down. For example, a virtual machine 310 may start up or shut down when instructed by virtual machine controller 230. A user device 210 may interact with a running virtual machine 310 to run an application, to perform a function, to provide certain content, or the like. In some implementations, user device 210 may interact with a virtual machine 310 using an application, such as a remote desktop application.

The example quantity and configuration of components illustrated in FIG. 3 are provided for simplicity. In practice, virtualization server 240 may include additional components, fewer components, different components, or differently-arranged components than illustrated in FIG. 3.

Figure 4:
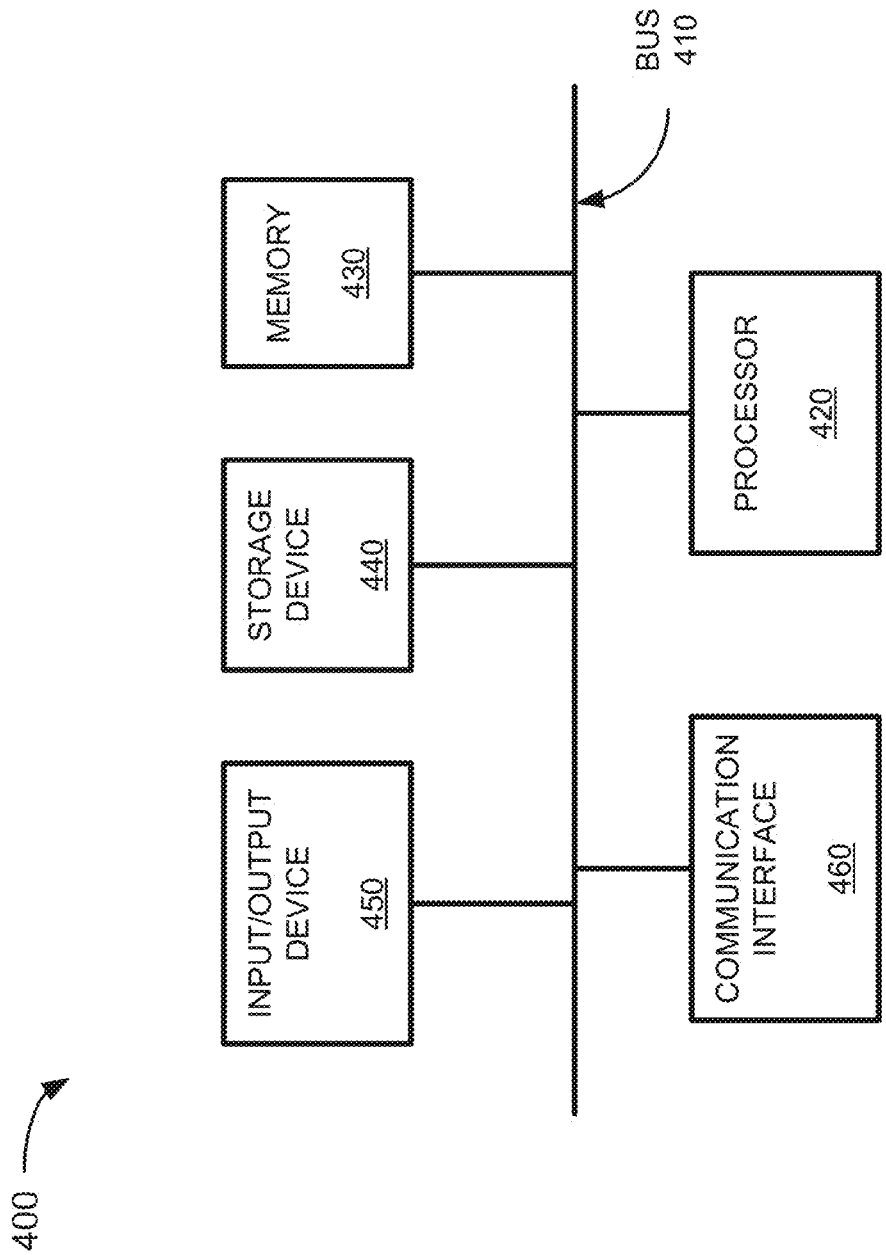
FIG. 4 is a diagram illustrating example components of a device in the example environments of FIGS. 2A and/or 2B.

FIG. 4 is a diagram illustrating example components of a device 400. Device 400 may correspond to one or more of the devices illustrated in FIGS. 2A and 2B. For example, user device 210, network device 220, virtual machine controller 230, virtualization controller 240, and/or collection device 250 may include one or more devices 400 and/or one or more components of device 400.

As shown in FIG. 4, device 400 may include a bus 410, a processor 420, a memory 430, a storage device 440, an input/output device 450, and a communication interface 460. Bus 410 may include a path, or a collection of paths, that permits communication among the components of device 400.

Processor 420 may include a processor, a microprocessor, an application specific integrated circuit (ASIC), a field programmable gate array (FPGA), or another type of processing component that interprets and executes instructions. Memory 430 may include a random access memory (RAM) or another type of dynamic storage device that stores information and/or instructions for execution by processor 420; a read only memory (ROM) or another type of static storage device that stores static information and/or instructions for use by processor 420; and/or another type of memory, such as a hard drive, a cache, or a flash memory. Storage device 440 may include a recording medium to store data that may be used by processor 420.

Input/output device 450 may include a component that permits an operator to input information to device 400, such as a button, a keyboard, a keypad, a touch screen display, or the like; and/or a component that outputs information to the operator, such as a light emitting diode (LED), a display, a speaker, or the like.

Communication interface 460 may include any transceiver-like component that enables device 400 to communicate with other devices and/or systems. For example, communication interface 460 may include a separate transmitter and receiver, or a transceiver that combines the functionality of both a transmitter and a receiver. Communication interface 460 may include a wired interface, a wireless interface, or both a wired interface and a wireless interface.

Device 400 may perform certain operations, as described in detail below. According to an example implementation, device 400 may perform these operations in response to processor 420 executing sequences of instructions contained in a computer-readable medium, such as memory 430. A computer-readable medium may be defined as a non-transitory memory device. A memory device may include space within a single physical storage device or spread across multiple physical storage devices.

The software instructions may be read into memory 430 from another computer-readable medium, such as storage device 440, or from another device via communication interface 460. The software instructions contained in memory 430 may cause processor 420 to perform processes that will be described later. Alternatively, hardwired circuitry may be used in place of or in combination with software instructions to implement processes described herein. Thus, implementations described herein are not limited to any specific combination of hardware circuitry and software.

While FIG. 4 shows device 400 as having a particular quantity and arrangement of components, in some implementations, device 400 may include additional components, fewer components, different components, or differently-arranged components.

Figure 5:
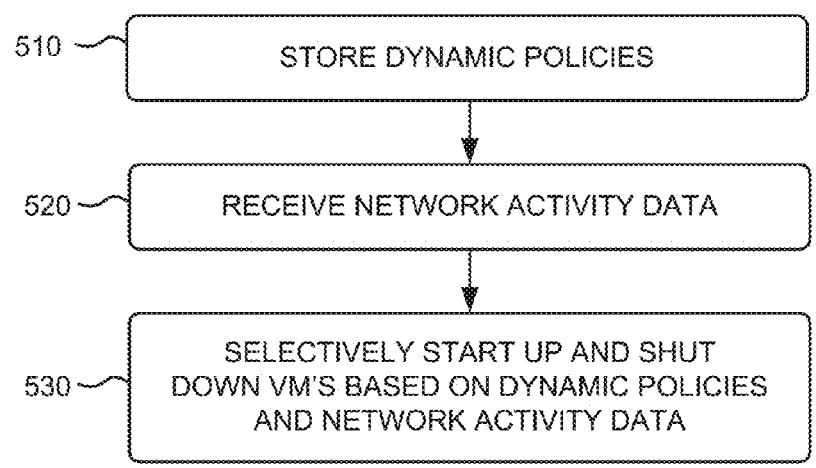
FIG. 5 is a flowchart of an example process for selectively starting up and shutting down virtual machines.

FIG. 5 is a flowchart of an example process 500 for selectively starting up and shutting down virtual machines. In some implementations, process 500 may be performed by virtual machine controller 230. In some implementations, one or more blocks of process 500 may be performed by one or more devices instead of, or possibly in conjunction with, virtual machine controller 230, such as virtualization server 240.

Process 500 may include storing dynamic policies (block 510). For example, virtual machine controller 230 may store dynamic policies relating to when to start up and shut down virtual machines 310. In some implementations, virtual machine controller 230 may obtain some or all of the dynamic policies from an operator. For example, an operator may input some or all of the dynamic policies into virtual machine controller 230. Additionally, or alternatively, virtual machine controller 230 may obtain some or all of the dynamic policies from another device. For example, a device may provide some or all of the dynamic policies for storage by virtual machine controller 230. Additionally, or alternatively, virtual machine controller 230 may generate some or all of the dynamic policies. For example, virtual machine controller 230 may analyze a history of network activity data relating to interactions with virtual machines 310 and/or information regarding associations between virtual machines 310 and user devices 210, users, and/or applications to generate some or all of the dynamic policies. Virtual machine controller 230 may identify patterns and generate some or all of the dynamic policies based on the identified patterns.

Figure 6:
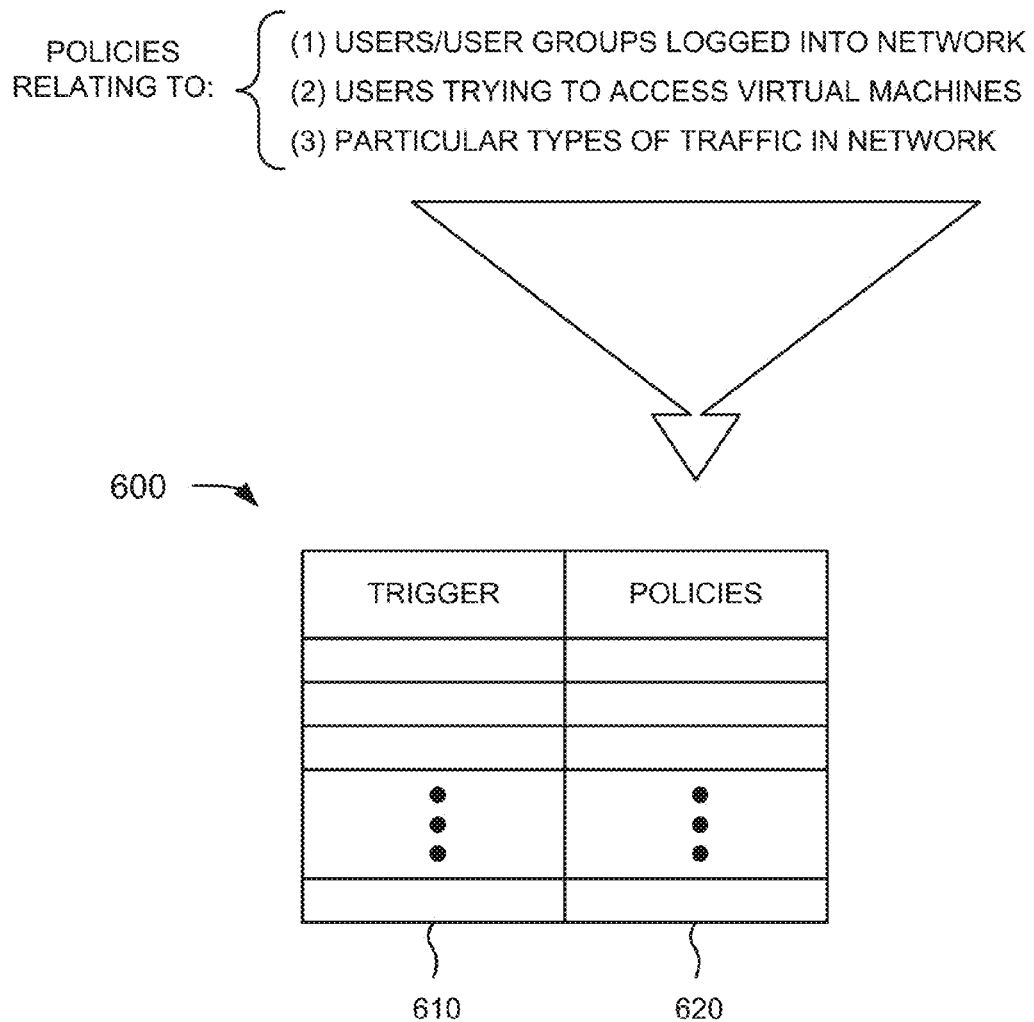
FIG. 6 is a diagram illustrating an example of a data structure that may store dynamic policies.

Virtual machine controller 230 may store the dynamic policies in a data structure. FIG. 6 is a diagram illustrating an example of a data structure 600 that may store dynamic policies. In some implementations, virtual machine controller 230 may store data structure 600 in a memory located in or accessible by virtual machine controller 230.

As shown in FIG. 6, data structure 600 may include a trigger field 610 and a policies field 620. Trigger field 610 may store information that may be used to identify relevant policies. Examples of information that may be stored in trigger field 610 include user identifiers, user group identifiers, user device identifiers, and application identifiers. A user identifier may include a string of characters that uniquely identifies a user of a user device 210. A user group identifier may include a string of characters that uniquely identifies a group of users, such as a group of users having some formal (or informal) relationship like users working for the same department of a company, users signed up for the same class at a school, and/or any other group of users. A user device identifier may include a string of characters that uniquely identifies a user device 210. An application identifier may include a string of characters that uniquely identifies an application capable of executing on or communicating with a user device 210.

Policies field 620 may store dynamic policies. The policies may relate to users or user groups that have logged into the network, users trying to access particular virtual machines 310, and/or particular types of network traffic in the network. The policies may indicate when to start up a particular virtual machine 310 and/or when to shut down a particular virtual machine 310. One example policy might indicate to start up a particular virtual machine 310 when a particular user logs into the network. Another example policy might indicate to shut down a particular virtual machine 310 when a particular user logs out of the network. Another example policy might indicate to start up a particular virtual machine 310 when a user, of a particular user group, logs into the network. Another example policy might indicate to shut down a particular virtual machine 310 when no users, of a particular user group, are logged into the network. Another example policy might indicate to start up a particular virtual machine 310 when a user attempts to access a particular virtual machine 310. Another example policy might indicate to start up a particular virtual machine 310 when network traffic is observed that relates to a particular application, such as network traffic received at a particular port, network traffic corresponding to a particular network address (e.g., a uniform resource locator (URL), a uniform resource identifier (URI), an internet protocol (IP) address, a media access control (MAC) address, etc.), network traffic otherwise identifying the particular application, or the like. The preceding example policies are intended to only be examples. In some implementations, policies field 620 may store additional policies, fewer policies, or different policies to facilitate a determination of when to start up or shut down a virtual machine 310.

While FIG. 6 shows data structure 600 as having a particular quantity and arrangement of fields, in some implementations, data structure 600 may include additional fields or different fields. While data structure 600 has been shown as a table, data structure may take any searchable form or arrangement of data within a memory device.

Returning to FIG. 5, process 500 may include receiving network activity data (block 520). For example, virtual machine controller 230 may receive network activity data relating to communications in the network. As described above, examples of the network activity data may include information regarding users logging into and out of the network, information regarding access attempts by users to virtual machines 310, information regarding communications relating to particular applications, or the like. In some implementations, virtual machine controller 230 may receive the network activity data directly from network devices 220. In some other implementations, virtual machine controller 230 may receive the network activity data from network devices 220 via one or more other devices, such as via collection device 250. In yet some other implementations, virtual machine controller 230 may receive some network activity data directly from network devices 220 and may receive some other network activity data from one or more other devices (e.g., collection device 250).

Process 500 may include selectively starting up and shutting down virtual machines based on the dynamic policies and the network activity data (block 530). For example, virtual machine controller 230 may determine, based on the network activity data and the dynamic policies, whether to start up or shut down a virtual machine 310. For example, virtual machine controller 230 may search the policies (e.g., stored in data structure 600), based on information in the network activity data, to identify a policy that is relevant to the network activity data. Based on the identified policy, virtual machine controller 230 may determine whether to start up or shut down a virtual machine 310.

When virtual machine controller 230 determines that a particular virtual machine 310 should be started up, virtual machine controller 230 may control the particular virtual machine 310, via its API, to cause the particular virtual machine 310 to start up. When virtual machine controller 230 determines that a particular virtual machine 310 should be shut down, virtual machine controller 230 may control the particular virtual machine 310, via its API, to cause the particular virtual machine 310 to shut down.

While FIG. 5 shows process 500 as including a particular quantity and arrangement of blocks, in some implementations, process 500 may include fewer blocks, additional blocks, or a different order of blocks. Additionally, or alternatively, some of the blocks may be performed in parallel.

Figure 7:
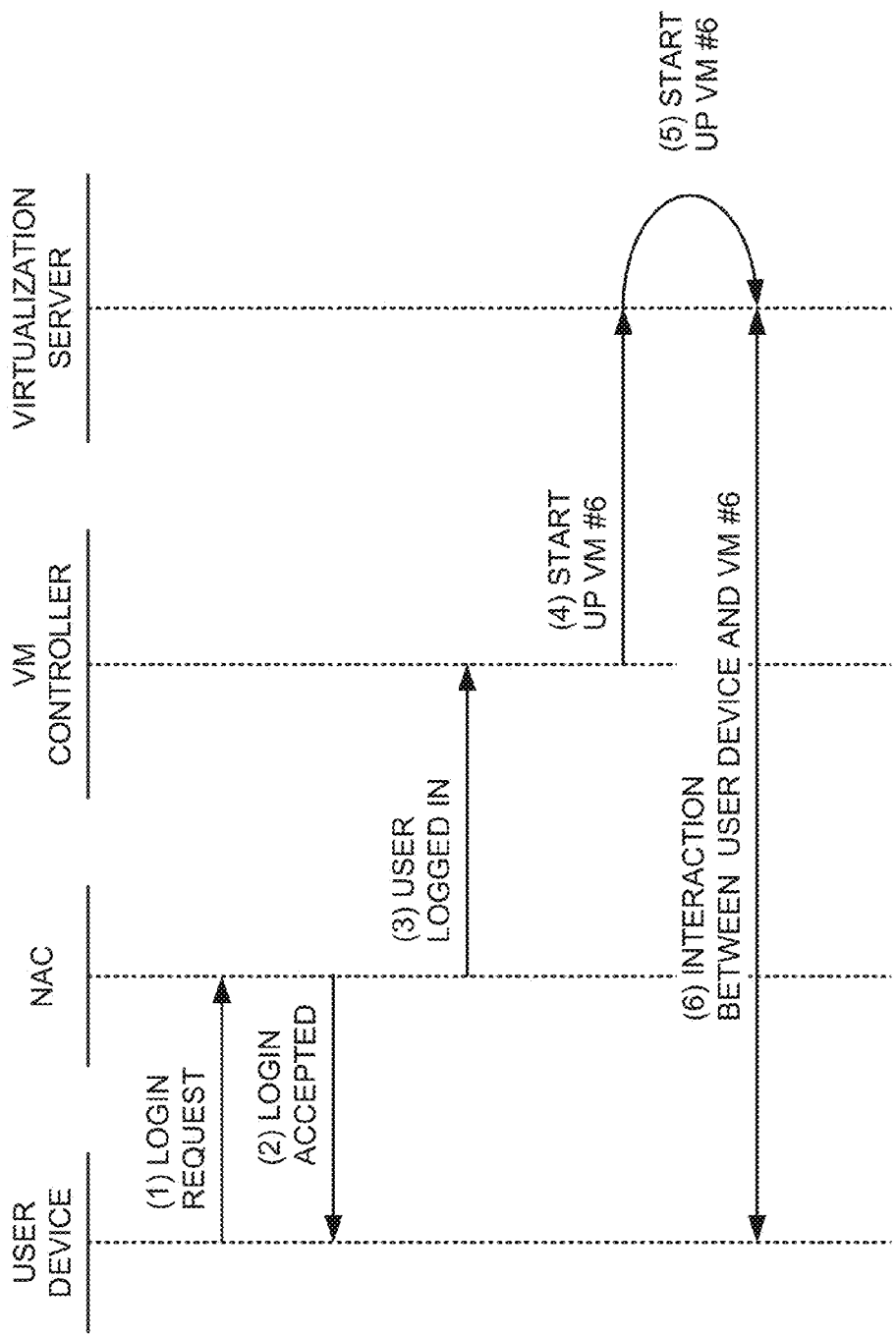
FIGS. 7-11 are diagrams of example systems and/or methods described herein.

FIGS. 7-11 are diagrams illustrating examples of systems and/or methods described herein. FIG. 7 may relate to a situation where a user logs into a network, in environment 200 (FIG. 2A), and interacts with a particular virtual machine (shown as VM #6). The user device may correspond to user device 210, the network access controller (NAC) may correspond to network device 220, the virtual machine (VM) controller may correspond to virtual machine controller 230, and the virtualization server may correspond to virtualization server 240 in FIG. 2A.

Assume that a user inputs a command into the user device to issue a request to log into the network. As shown by (1) in FIG. 7, the user device may generate a login request message and may transmit the login request message to the NAC. The NAC may receive the login request message. The NAC may process the login request message to determine whether the user is an authorized user that is permitted to access the network. Assume that the user is an authorized user. In this case, the NAC may generate a login accepted message and may transmit the login accepted message to the user device, as shown by (2) in FIG. 7.

The NAC may transmit information, to the VM controller, that the user has used the user device to log into the network, as shown by (3) in FIG. 7. The VM controller may analyze the dynamic policies based on the information received from the NAC. Assume that the dynamic policies indicate that virtual machine VM #6 should be started up when the user logs into the network. In this case, the VM controller may send an instruction to virtual machine VM #6 to start up, as shown by (4) in FIG. 7. Based on the instruction from the VM controller, virtual machine VM #6 may start up, as shown by (5) in FIG. 7. For example, virtual machine VM #6 may power up, boot up, or otherwise begin executing.

At some later time, the user may interact with virtual machine VM #6 using the user device, as shown by (6) in FIG. 7. For example, the user device may provide information to an application running on virtual machine VM #6, request information from an application running on virtual machine VM #6, or otherwise communicate or interact with an application running on virtual machine VM #6.

While FIG. 7 shows a particular quantity and arrangement of operations, in some implementations, there may be fewer operations, additional operations, or a different arrangement of operations. Additionally, or alternatively, some of the operations may be performed in parallel or in a different order.

Figure 8:
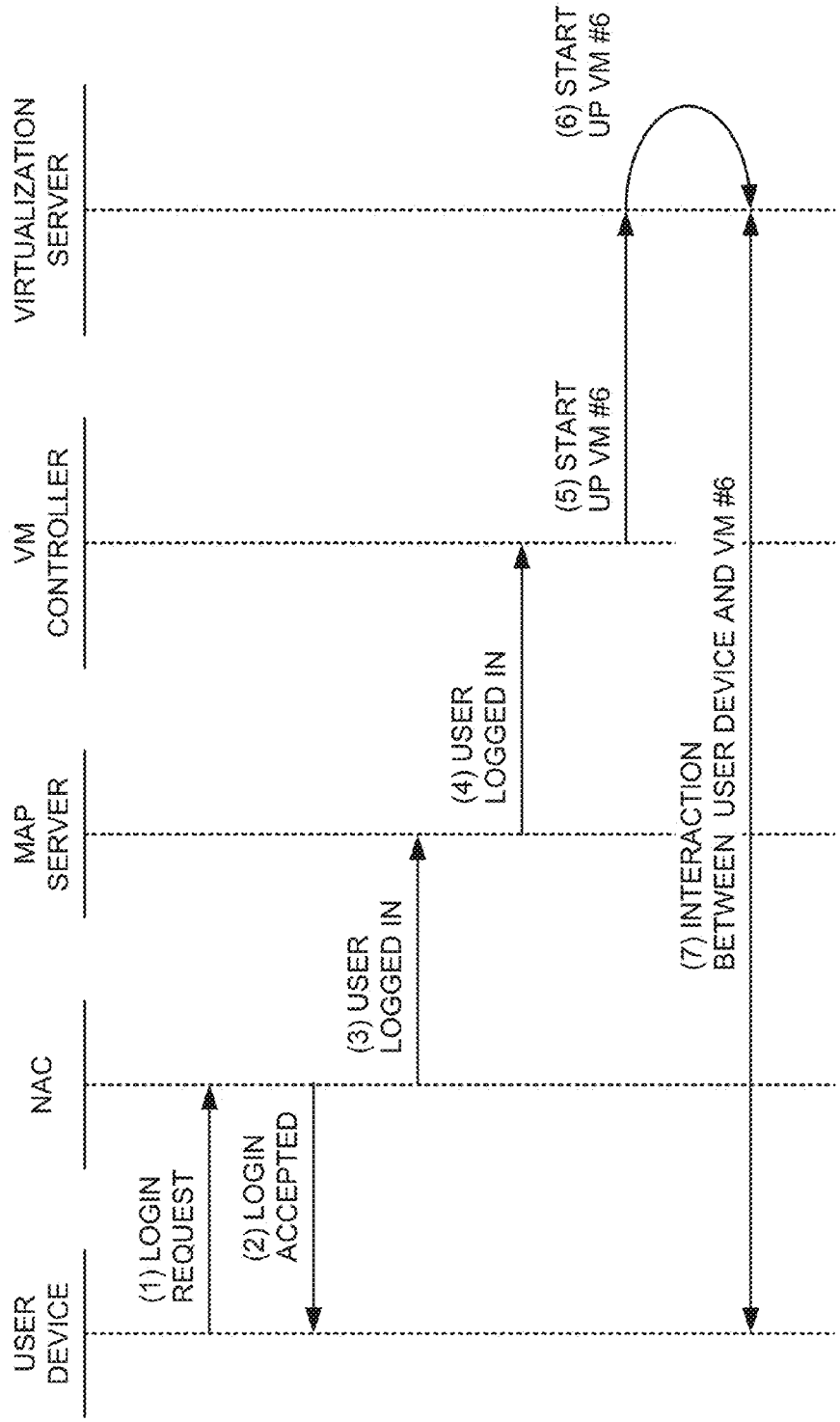

FIG. 8 may relate to a situation where a user logs into a network, in environment 205 (FIG. 2B), and interacts with a particular virtual machine (shown as VM #6). The user device may correspond to user device 210, the network access controller (NAC) may correspond to network device 220, the MAP server may correspond to collection device 250, the virtual machine (VM) controller may correspond to virtual machine controller 230, and the virtualization server may correspond to virtualization server 240 in FIG. 2B.

Assume that a user, of a particular user group, inputs a command into the user device to issue a request to log into the network. As shown by (1) in FIG. 8, the user device may generate a login request message and may transmit the login request message to the NAC. The NAC may receive the login request message. The NAC may process the login request message to determine whether the user is an authorized user that is permitted to access the network. Assume that the user is an authorized user. In this case, the NAC may generate a login accepted message and may transmit the login accepted message to the user device, as shown by (2) in FIG. 8.

The NAC may transmit information, to the MAP server, that the user has used the user device to log into the network, as shown by (3) in FIG. 8. Assume that the VM controller has subscribed to receive network activity data from the MAP server. In this case, the MAP server may transmit information, to the VM controller, that the user has used the user device to log into the network, as shown by (4) in FIG. 8.

The VM controller may analyze the dynamic policies based on the information received from the MAP server. Assume that the dynamic policies indicate that virtual machine VM #6 should be started up when a user, belonging to the particular user group, logs into the network. In this case, the VM controller may send an instruction to virtual machine VM #6 to start up, as shown by (5) in FIG. 8. Based on the instruction from the VM controller, virtual machine VM #6 may start up, as shown by (6) in FIG. 8. For example, virtual machine VM #6 may power up, boot up, or otherwise begin executing.

At some later time, the user may interact with virtual machine VM #6 using the user device, as shown by (7) in FIG. 8. For example, the user device may provide information to an application running on virtual machine VM #6, request information from an application running on virtual machine VM #6, or otherwise communicate or interact with an application running on virtual machine VM #6.

While FIG. 8 shows a particular quantity and arrangement of operations, in some implementations, there may be fewer operations, additional operations, or a different arrangement of operations. Additionally, or alternatively, some of the operations may be performed in parallel or in a different order.

Figure 9:
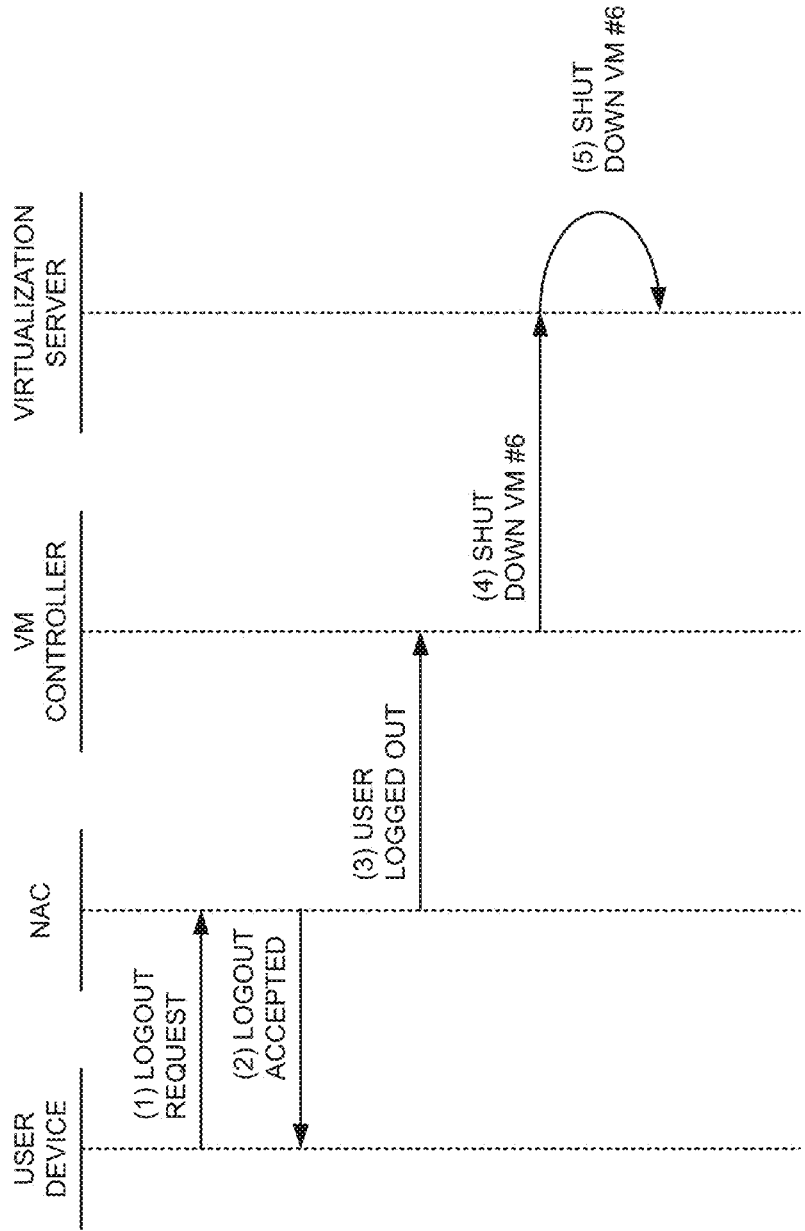

FIG. 9 may relate to a situation where a user logs out of a network in environment 200 (FIG. 2A). The user device may correspond to user device 210, the network access controller (NAC) may correspond to network device 220, the virtual machine (VM) controller may correspond to virtual machine controller 230, and the virtualization server may correspond to virtualization server 240 in FIG. 2A.

Assume that a user inputs a command into the user device to issue a request to log out of the network. As shown by (1) in FIG. 9, the user device may generate a logout request message and may transmit the logout request message to the NAC. The NAC may receive the logout request message. The NAC may process the logout request message to disconnect the user from the network. The NAC may generate a logout accepted message and may transmit the logout accepted message to the user device, as shown by (2) in FIG. 9.

The NAC may transmit information, to the VM controller, that the user has used the user device to log out of the network, as shown by (3) in FIG. 9. The VM controller may analyze the dynamic policies based on the information received from the NAC. Assume that the dynamic policies indicate that virtual machine VM #6 should be shut down when the user logs out of the network. In this case, the VM controller may send an instruction to virtual machine VM #6 to shut down, as shown by (4) in FIG. 9. Based on the instruction from the VM controller, virtual machine VM #6 may shut down, as shown by (5) in FIG. 9. For example, virtual machine VM #6 may power down or otherwise cease executing.

While FIG. 9 shows a particular quantity and arrangement of operations, in some implementations, there may be fewer operations, additional operations, or a different arrangement of operations. Additionally, or alternatively, some of the operations may be performed in parallel or in a different order.

Figure 10:
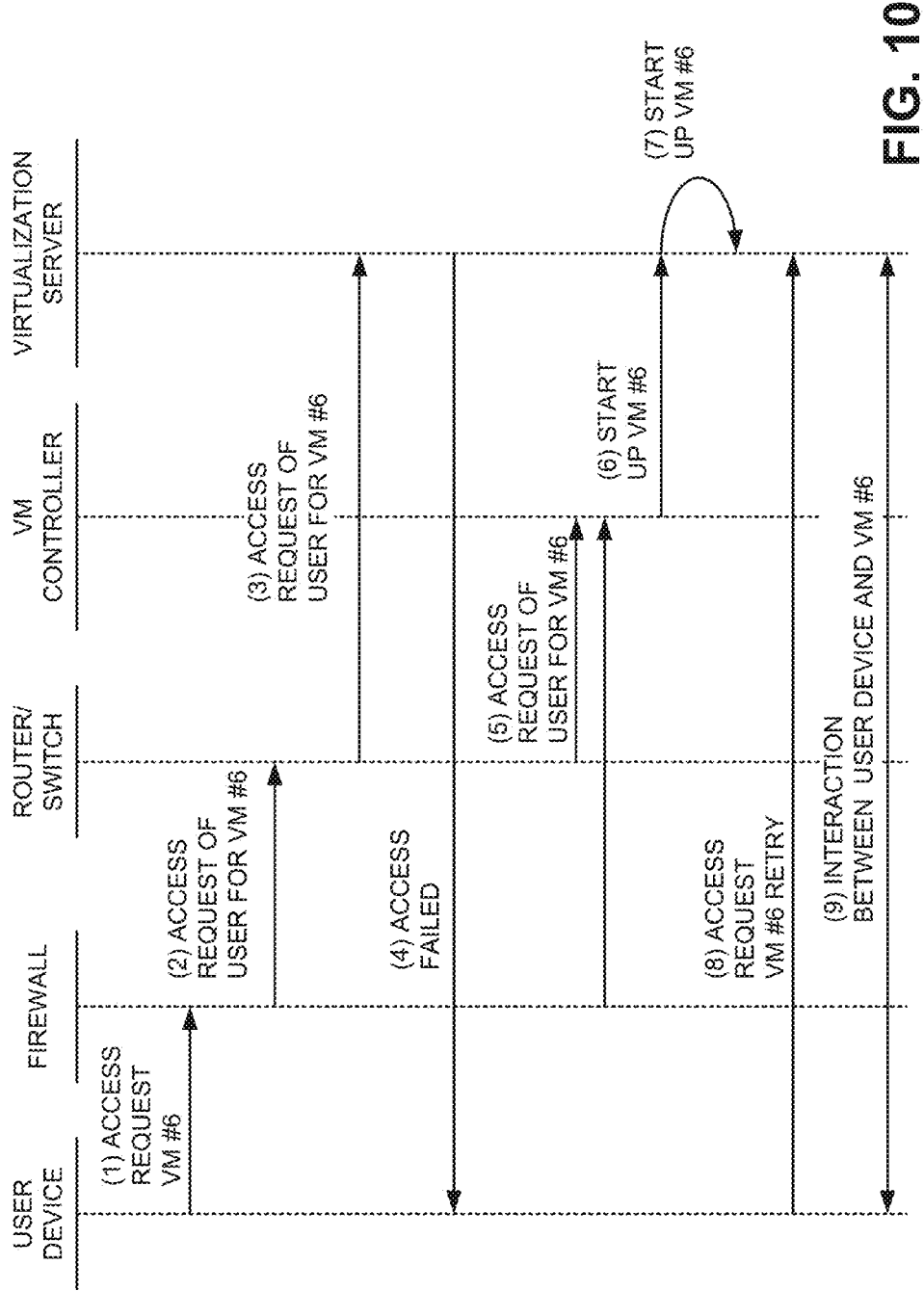

FIG. 10 may relate to a situation where a user, already logged into a network in environment 200 (FIG. 2A), attempts to access a particular virtual machine (shown as VM #6). The user device may correspond to user device 210, the firewall may correspond to a network device 220, the router/switch may correspond to another network device 220, the virtual machine (VM) controller may correspond to virtual machine controller 230, and the virtualization server may correspond to virtualization server 240 in FIG. 2A.

Assume that a user inputs a command into the user device to issue a request to access virtual machine VM #6. The request may refer specifically to virtual machine VM #6 or may refer to an application or content associated with virtual machine VM #6. As shown by (1) in FIG. 10, the user device may generate an access request message and may transmit the access request message to the firewall. The firewall may receive the access request message. The firewall may process the access request message to determine whether the access request message is malicious. Assume that the firewall determines that the access request message is not malicious. In this case, the firewall may send the access request message onto the router/switch, as shown by (2) in FIG. 10.

The router/switch may receive the access request message and may send the access request message to the virtualization server, as shown by (3) in FIG. 10. Assume that virtual machine VM #6 is not executing on the virtualization server. In this case, the virtualization server may return an access failed message to the user device, as shown by (4) in FIG. 10. Alternatively, the virtualization server may not respond at all to the user device's access request. In either situation, the user device may be notified of a failure of the access request (e.g., either by receiving the access failed message or by failing to receive any response for a particular amount of time).

The firewall and/or the router/switch may transmit information, to the VM controller, that the user is attempting to access virtual machine VM #6, as shown by (5) in FIG. 10. The VM controller may analyze the dynamic policies based on the information received from the firewall and/or the router/switch. Assume that the dynamic policies indicate that virtual machine VM #6 should be started up when a user attempts to access virtual machine VM #6. In this case, the VM controller may send an instruction to virtual machine VM #6 to start up, as shown by (6) in FIG. 10. Based on the instruction from the VM controller, virtual machine VM #6 may start up, as shown by (7) in FIG. 10. For example, virtual machine VM #6 may power up, boot up, or otherwise begin executing.

In response to failure of the access attempt by the user device, the user device may retry the access request, as shown by (8) in FIG. 10. While FIG. 10 shows the access request retry as going directly from the user device to the virtualization server, the access request retry may follow the same path as the initial access request. The user device may be configured to retry the access request a particular number of times. Assume that, prior to one of these retry attempts, virtual machine VM #6 starts up. Because virtual machine VM #6 has started up prior to the access request retry being received by the virtualization server, the access request may succeed this time. Thus, the user may interact with virtual machine VM #6 using the user device, as shown by (9) in FIG. 10. For example, the user device may provide information to an application running on virtual machine VM #6, request information from an application running on virtual machine VM #6, or otherwise communicate or interact with an application running on virtual machine VM #6.

While FIG. 10 shows a particular quantity and arrangement of operations, in some implementations, there may be fewer operations, additional operations, or a different arrangement of operations. Additionally, or alternatively, some of the operations may be performed in parallel or in a different order. For example, the firewall and/or the router/switch may transmit information, to the VM controller, that the user is attempting to access virtual machine VM #6 prior to the user device determining that the first access request has failed.

Figure 11:
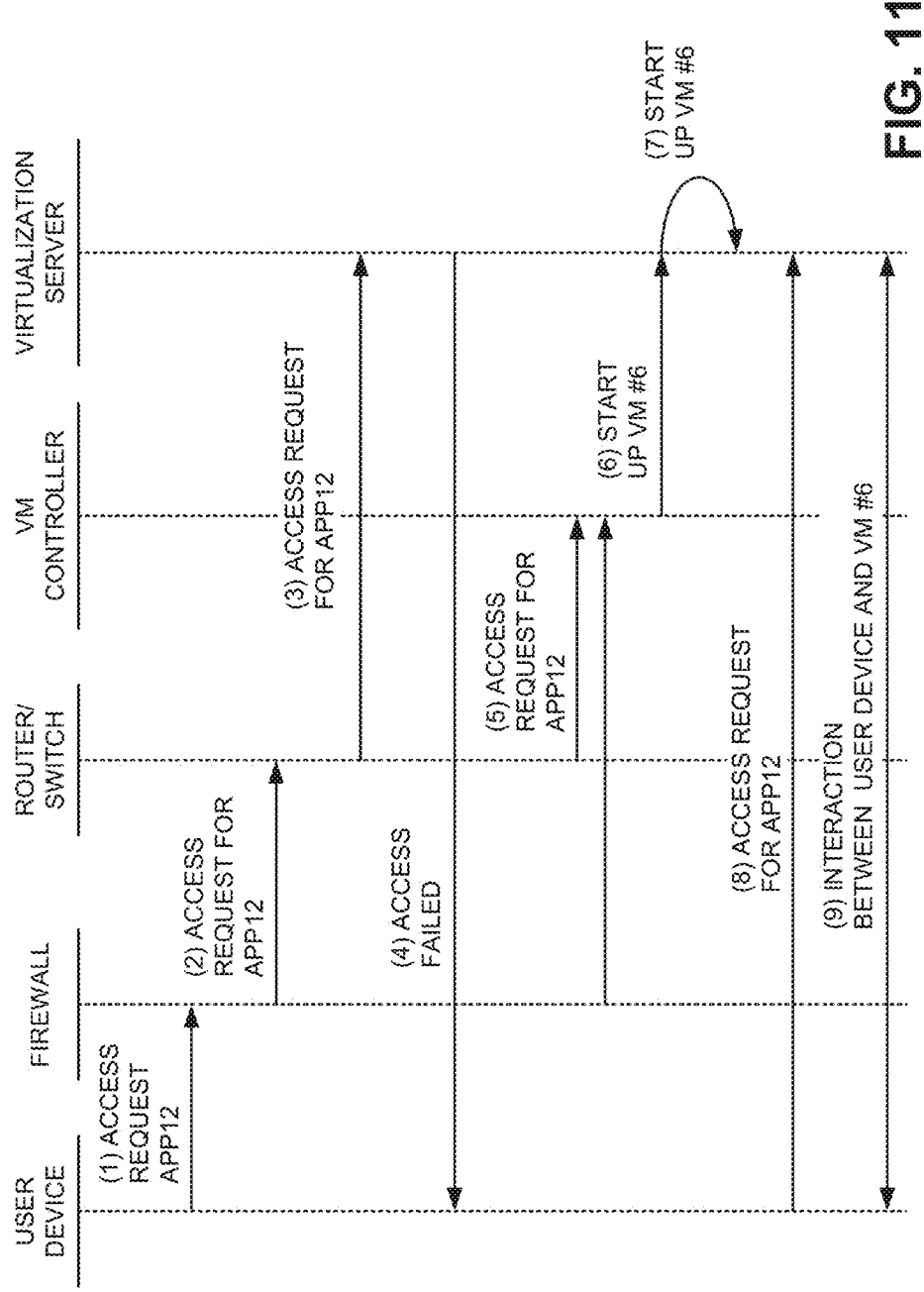

FIG. 11 may relate to a situation where a user, already logged into a network in environment 200 (FIG. 2A), attempts to access a particular application. The user device may correspond to user device 210, the firewall may correspond to a network device 220, the router/switch may correspond to another network device 220, the virtual machine (VM) controller may correspond to virtual machine controller 230, and the virtualization server may correspond to virtualization server 240 in FIG. 2A.

Assume that a user inputs a command into the user device to issue a request to access a particular application that is available via virtual machine VM #6. The request may refer specifically to the particular application or may be directed to a particular port or network address associated with the particular application. As shown by (1) in FIG. 11, the user device may generate an access request message and may transmit the access request message to the firewall. The firewall may receive the access request message. The firewall may process the access request message to determine whether the access request message is malicious. Assume that the firewall determines that the access request message is not malicious. In this case, the firewall may send the access request message onto the router/switch, as shown by (2) in FIG. 11.

The router/switch may receive the access request message and may send the access request message to the virtualization server, as shown by (3) in FIG. 11. Assume that virtual machine VM #6 is not executing on the virtualization server. In this case, the virtualization server may return an access failed message to the user device, as shown by (4) in FIG. 11. Alternatively, the virtualization server may not respond at all to the user device's access request. In either situation, the user device may be notified of a failure of the access request (e.g., either by receiving the access failed message or by failing to receive any response for a particular amount of time).

The firewall and/or the router/switch may transmit information, to the VM controller, that the user is attempting to access the particular application, as shown by (5) in FIG. 11. The VM controller may analyze the dynamic policies based on the information received from the firewall and/or the router/switch. Assume that the dynamic policies indicate that virtual machine VM #6 should be started up when a user attempts to access the particular application. In this case, the VM controller may send an instruction to virtual machine VM #6 to start up, as shown by (6) in FIG. 11. Based on the instruction from the VM controller, virtual machine VM #6 may start up, as shown by (7) in FIG. 11. For example, virtual machine VM #6 may power up, boot up, or otherwise begin executing.

In response to failure of the access attempt by the user device, the user device may retry the access request, as shown by (8) in FIG. 11. While FIG. 11 shows the access request retry as going directly from the user device to the virtualization server, the access request retry may follow the same path as the initial access request. The user device may be configured to retry the access request a particular number of times. Assume that, prior to one of these retry attempts, virtual machine VM #6 starts up. Because virtual machine VM #6 has started up prior to the access request retry being received by the virtualization server, the access request may succeed this time. Thus, the user may interact with virtual machine VM #6 using the user device, as shown by (9) in FIG. 11. For example, the user device may provide information to an application running on virtual machine VM #6, request information from an application running on virtual machine VM #6, or otherwise communicate or interact with an application running on virtual machine VM #6.

While FIG. 11 shows a particular quantity and arrangement of operations, in some implementations, there may be fewer operations, additional operations, or a different arrangement of operations. Additionally, or alternatively, some of the operations may be performed in parallel or in a different order. For example, the firewall and/or the router/switch may transmit information, to the VM controller, that the user is attempting to access the particular application prior to the user device determining that the first access request has failed.

Implementations, described herein, may provide a system and/or method for dynamically controlling the starting up and shutting down of virtual machines. Because virtual machines, that are executing when not being used, wastes power, intelligently starting up and shutting down the virtual machines reduces power and costs.

The foregoing description provides illustration and description, but is not intended to be exhaustive or to limit the implementations to the precise form disclosed. Modifications and variations are possible in light of the above disclosure or may be acquired from practice of the implementations.

It will be apparent that aspects described herein may be implemented in many different forms of software, firmware, and hardware in the implementations illustrated in the figures. The actual software code or specialized control hardware used to implement these aspects does not limit the implementations. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential to the invention unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed:

1. A system comprising:
a controller device, comprising a processor and connected to a plurality of virtual machines, to:
receive information indicating that a user device, logged into a network, is attempting to access a virtual machine of the plurality of virtual machines,
the information being received based on the user device transmitting a request to access the virtual machine, and
the user device receiving an indication that the request to access the virtual machine is denied;
search a data structure, based on the information, to identify a dynamic policy that is based on a pattern of network activity associated with the network and one or more particular types of traffic in the network,
the pattern of network activity being identified based on network activity data provided by a collection device,
the collection device collecting network activity data from a plurality of network devices associated with the network;
determine, based on the dynamic policy, that the virtual machine is to be started; and
transmit, based on determining that the virtual machine is to be started, an instruction to the virtual machine to cause the virtual machine to start up,
the instruction being transmitted to the virtual machine to enable the user device to access the virtual machine.

2. The system of claim 1, where, when receiving the information, the controller device is to:
receive the information from a firewall or a router.

3. The system of claim 1,
where the controller device is further to:
store the dynamic policy in the data structure,
where the dynamic policy is stored in association with information identifying one or more users.

4. The system of claim 1, where the dynamic policy indicates a time when the virtual machine is to be started.

5. The system of claim 1, where the dynamic policy relates to users that have logged into the network.

6. The system of claim 1, where the dynamic policy relates to users trying to access the plurality of virtual machines.

7. The system of claim 1, where the one or more particular types of traffic in the network include at least one of:
network traffic relating to a particular application, or
network traffic received at a particular port.

8. A method comprising:
receiving, by a device, information indicating that a user device, logged into a network, is attempting to access a virtual machine of a plurality of virtual machines,
the information being received based on the user device transmitting a request to access the virtual machine,
the user device receiving an indication that the request to access the virtual machine is denied;
searching, by the device and based on the information, a data structure to identify a dynamic policy that is based on a pattern of network activity associated with the network and one or more particular types of traffic in the network,
the pattern of network activity being identified based on network activity data provided by a collection device,
the collection device collecting network activity data from a plurality of network devices associated with the network;
determining, by the device and based on the dynamic policy, that the virtual machine is to be started; and
transmitting, by the device and based on determining that the virtual machine is to be started, an instruction to the virtual machine to cause the virtual machine to start up,
the instruction being transmitted to the virtual machine to enable the user device to access the virtual machine after the user device has received the indication that the request to access the virtual machine is denied.

9. The method of claim 8, where receiving the information includes:
receiving the information from a firewall or a router.

10. The method of claim 8, where the dynamic policy indicates that the virtual machine is to be started up when a user, associated with the user device, attempts to access the virtual machine.

11. The method of claim 8, further comprising:
storing the dynamic policy in the data structure,
where the dynamic policy is stored in association with information identifying one or more users.

12. The method of claim 8, where the dynamic policy indicates a time when the virtual machine is to be started.

13. The method of claim 8, where the dynamic policy relates to users trying to access the plurality of virtual machines.

14. The method of claim 8, where the one or more particular types of traffic in the network include at least one of:
network traffic relating to a particular application, or
network traffic received at a particular port.

15. A non-transitory computer-readable medium storing instructions, the instructions comprising:
one or more instructions which, when executed by a controller device connected to a plurality of virtual machines, cause the controller device to:

receive information indicating that a user device, logged into a network, is attempting to access a virtual machine of the plurality of virtual machines,
the information being received based on the user device transmitting a request to access the virtual machine,
the user device receiving an indication that the request to access the virtual machine is denied;
search a data structure, based on the information, to identify a dynamic policy that is based on a pattern of network activity associated with the network and one or more particular types of traffic in the network,
the pattern of network activity being identified based on network activity data provided by a collection device,
the collection device collecting network activity data from a plurality of network devices associated with the network;
determine, based on the dynamic policy, that the virtual machine is to be started; and
transmit, based on determining that the virtual machine is to be started, an instruction to the virtual machine to cause the virtual machine to start up,
the instruction being transmitted to the virtual machine to enable the user device to access the virtual machine.

16. The non-transitory computer-readable medium of claim 15, where the one or more instructions to receive the information include one or more instructions to:
receive the information from a firewall or a router.

17. The non-transitory computer-readable medium of claim 15, where the instructions further comprise one or more instructions to:
store the dynamic policy in the data structure,
where the dynamic policy is stored in association with information identifying one or more users.

18. The non-transitory computer-readable medium of claim 15, where the dynamic policy indicates a time when the virtual machine is to be started.

19. The non-transitory computer-readable medium of claim 15, where the dynamic policy relates to users that have logged into the network or are trying to access the plurality of virtual machines.

20. The non-transitory computer-readable medium of claim 15, where the one or more particular types of traffic in the network include at least one of:
network traffic relating to a particular application, or
network traffic received at a particular port.

* * * * *